United States Patent
Osterloh et al.

(10) Patent No.: US 7,417,557 B2
(45) Date of Patent: Aug. 26, 2008

(54) APPLICATIONS FOR A LOW COST RECEIVER IN AN AUTOMATIC METER READING SYSTEM

(75) Inventors: Christopher L. Osterloh, Waseca, MN (US); Benjamin L. Anderson, Janesville, MN (US); Mark K. Cornwall, Spokane, WA (US); Jeffrey L. Delamater, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 405 days.

(21) Appl. No.: 11/105,663

(22) Filed: Apr. 14, 2005

(65) Prior Publication Data

US 2005/0179561 A1 Aug. 18, 2005

Related U.S. Application Data

(63) Continuation-in-part of application No. 10/838,165, filed on May 3, 2004, now Pat. No. 7,230,972.

(60) Provisional application No. 60/468,550, filed on May 7, 2003.

(51) Int. Cl.
*G08B 23/00* (2006.01)
(52) U.S. Cl. .............................. 340/870.03; 340/870.02; 370/338; 375/130
(58) Field of Classification Search ............ 340/870.02, 340/870.03; 370/335, 338; 375/130, 133, 375/134
See application file for complete search history.

(56) References Cited

U.S. PATENT DOCUMENTS

| | | | |
|---|---|---|---|
| 3,919,640 A | 11/1975 | Simciak | |
| 4,589,075 A | 5/1986 | Buennagel | |
| 4,940,976 A | 7/1990 | Gastouniotis et al. | |
| 5,056,107 A | 10/1991 | Johnson et al. | |
| 5,278,551 A | 1/1994 | Wakatsuki et al. | |
| 5,335,246 A | 8/1994 | Yokev et al. | |
| 5,377,232 A | 12/1994 | Davidov et al. | |
| 5,430,759 A | 7/1995 | Yokev et al. | |

(Continued)

FOREIGN PATENT DOCUMENTS

JP 02246000 10/1990

(Continued)

OTHER PUBLICATIONS

Flyer from Itron, "The Future is Now".

*Primary Examiner*—Albert K. Wong
(74) *Attorney, Agent, or Firm*—Patterson, Thuente, Skaar & Christensen, P.A.

(57) ABSTRACT

An automatic meter reading (AMR) system includes a plurality of utility meter endpoints, each of which includes a radio-frequency (RF) transmitter adapted for transmitting endpoint information. A plurality of transceivers are adapted to read endpoints located throughout a designated coverage area, and each transceiver adapted to receive endpoint information from utility meter endpoints located within a corresponding portion of the designated coverage area. A central storage arrangement is adapted to communicate with each of the transceivers and to store endpoint information in a central database. The AMR system also includes a low cost receiver (LCR) having a communications range that defines a gap-filling coverage area. The LCR is adapted to automatically forward received endpoint information to the central storage arrangement.

44 Claims, 8 Drawing Sheets

U.S. PATENT DOCUMENTS

| | | | |
|---|---|---|---|
| 5,438,329 A | 8/1995 | Gastouniotis et al. | |
| 5,475,867 A | 12/1995 | Blum | |
| 5,499,266 A | 3/1996 | Yokev et al. | |
| 5,515,369 A | 5/1996 | Hammer, III et al. | |
| 5,519,387 A | 5/1996 | Besier et al. | |
| 5,528,621 A | 6/1996 | Heiman et al. | |
| 5,546,422 A | 8/1996 | Yokev et al. | |
| 5,604,768 A | 2/1997 | Fulton | |
| 5,631,636 A | 5/1997 | Bane | |
| 5,661,750 A | 8/1997 | Fulton | |
| 5,712,867 A | 1/1998 | Yokev et al. | |
| 5,764,158 A | 6/1998 | Franklin et al. | |
| 5,870,426 A | 2/1999 | Yokev et al. | |
| 5,874,903 A | 2/1999 | Shuey et al. | |
| 5,883,886 A | 3/1999 | Eaton et al. | |
| 5,892,758 A * | 4/1999 | Argyroudis | 370/335 |
| 5,914,672 A | 6/1999 | Glorioso et al. | |
| 6,014,089 A | 1/2000 | Tracy et al. | |
| 6,044,062 A | 3/2000 | Brownrigg et al. | |
| 6,047,016 A | 4/2000 | Ramberg et al. | |
| 6,061,453 A | 5/2000 | Bach | |
| 6,069,571 A | 5/2000 | Tell | |
| 6,078,785 A | 6/2000 | Bush | |
| 6,137,423 A | 10/2000 | Glorioso et al. | |
| 6,163,276 A | 12/2000 | Irving et al. | |
| 6,172,616 B1 | 1/2001 | Johnson et al. | |
| 6,178,197 B1 | 1/2001 | Froelich et al. | |
| 6,181,258 B1 | 1/2001 | Summers et al. | |
| 6,195,018 B1 | 2/2001 | Ragle et al. | |
| 6,208,696 B1 | 3/2001 | Giles | |
| 6,219,655 B1 | 4/2001 | Schleich et al. | |
| 6,246,677 B1 | 6/2001 | Nap et al. | |
| 6,249,516 B1 | 6/2001 | Brownrigg et al. | |
| 6,300,881 B1 | 10/2001 | Yee et al. | |
| 6,430,210 B1 | 8/2002 | McGrath et al. | |
| 6,437,692 B1 * | 8/2002 | Petite et al. | 340/540 |
| 6,452,986 B1 | 9/2002 | Luxford et al. | |
| 6,477,558 B1 | 11/2002 | Irving et al. | |
| 6,538,577 B1 | 3/2003 | Ehrke et al. | |
| 6,671,586 B2 | 12/2003 | Davis et al. | |
| 6,677,862 B1 | 1/2004 | Houlihane et al. | |
| 6,710,721 B1 | 3/2004 | Holowick | |
| 6,737,985 B1 | 5/2004 | Garrard et al. | |
| 6,755,148 B2 | 6/2004 | Holowick | |
| 6,778,099 B1 | 8/2004 | Meyer et al. | |
| 6,856,257 B1 * | 2/2005 | Van Heteren | 340/870.03 |
| 2002/0071478 A1 | 6/2002 | Cornwall et al. | |
| 2002/0082748 A1 | 6/2002 | Enga et al. | |

FOREIGN PATENT DOCUMENTS

| | | |
|---|---|---|
| JP | 05076075 | 3/1993 |
| JP | 06351071 | 12/1994 |
| JP | 11304842 | 11/1999 |
| WO | WO 98/10394 | 3/1998 |
| WO | WO 98/59427 | 12/1998 |
| WO | WO 98/59429 | 12/1998 |
| WO | WO 98/59444 | 12/1998 |
| WO | WO 98/59445 | 12/1998 |
| WO | WO 98/59446 | 12/1998 |
| WO | WO 99/57697 | 11/1999 |
| WO | WO 01/10070 | 2/2001 |
| WO | WO 01/55865 | 8/2001 |
| WO | WO 01/78804 | 10/2001 |

* cited by examiner

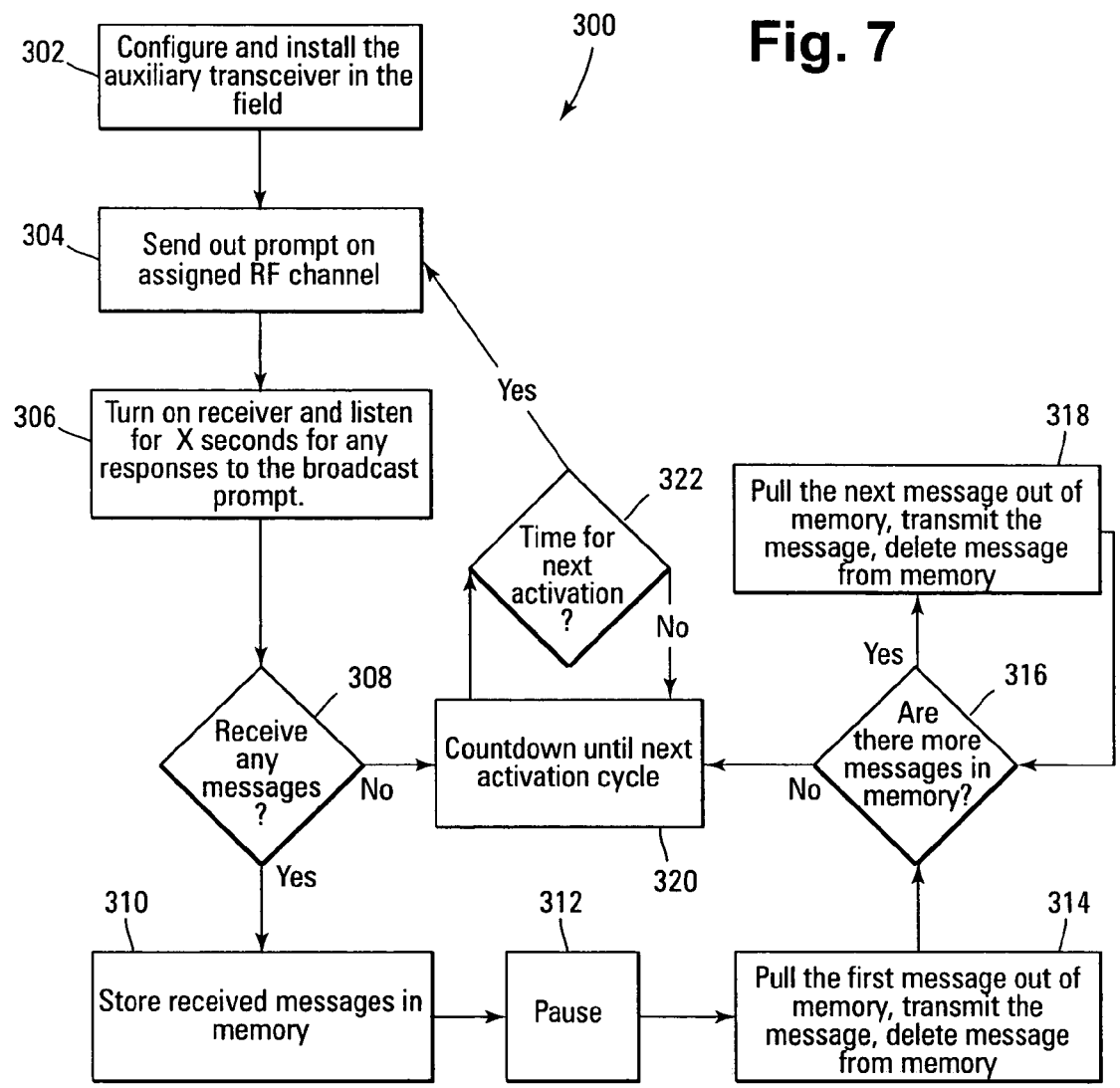

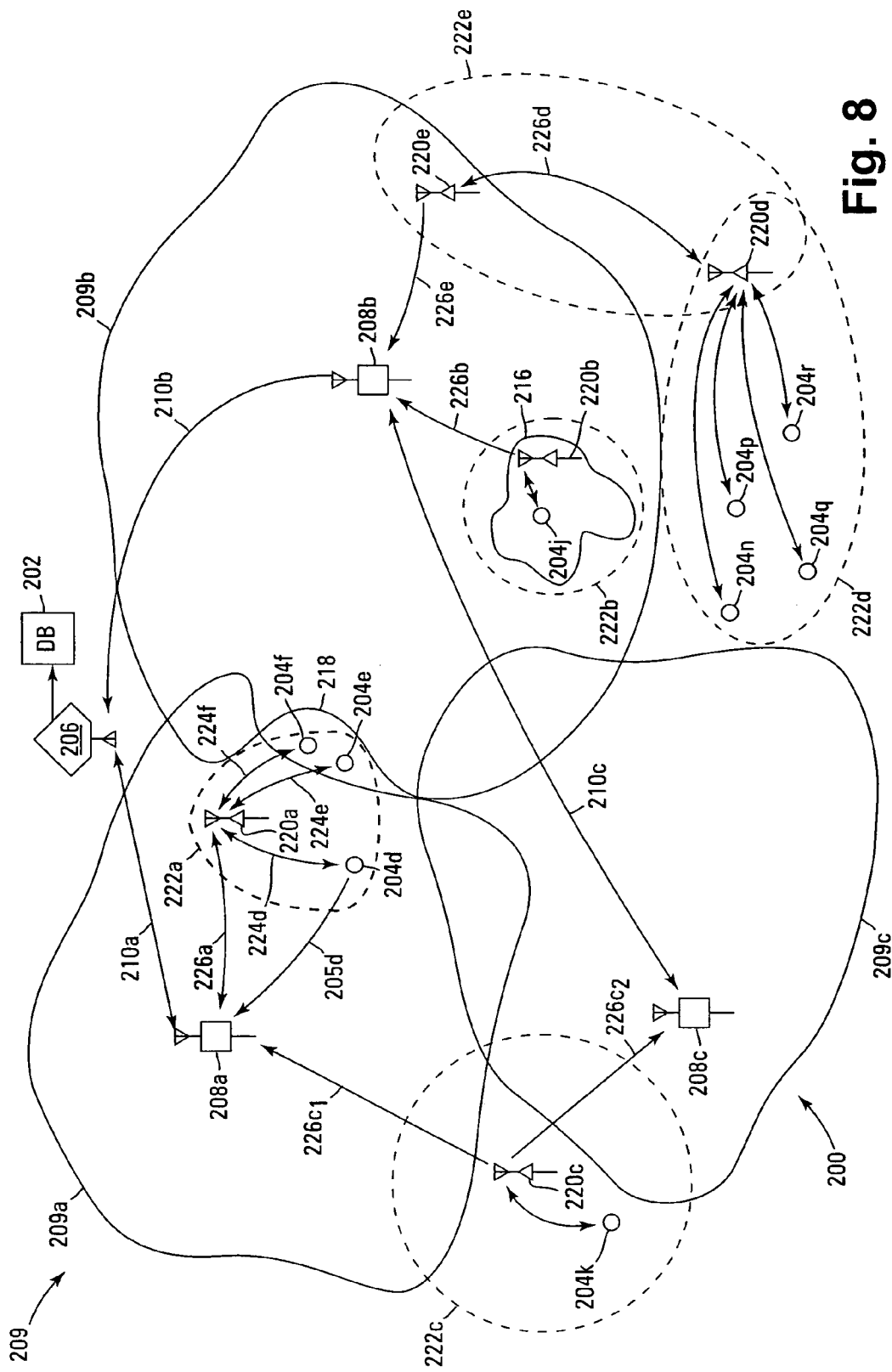

APPLICATIONS FOR A LOW COST RECEIVER IN AN AUTOMATIC METER READING SYSTEM

RELATED APPLICATIONS

The present application is a continuation-in-part of U.S. patent application Ser. No. 10/838,165, filed May 3, 2004, now U.S. Pat. No. 7,230,972 which claims the benefit of U.S. Provisional Application No. 60/468,550, filed May 7, 2003, and is incorporated by reference herein in its entirety.

The present invention is related to co-pending application assigned to the assignee of the present invention and entitled "Spread Spectrum Meter Reading System Utilizing Low-Speed/High Power Frequency Hopping," filed Jul. 23, 2001, application Ser. No. 09/911,840, the disclosure of which is hereby incorporated by reference in its entirety.

FIELD OF THE INVENTION

The present invention relates to a method and system for collecting data from remote utility meters and, more particularly, to a system and method for improving coverage of an automated meter reading system without substantially increasing the cost of the overall system.

BACKGROUND OF THE INVENTION

Wireless automatic meter reading (AMR) systems are well known. Typically, each utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless AMR systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of endpoint encoder transmitters that must be deployed as part of a utility AMR system for a large metropolitan area.

Synchronization between a transmitter and a receiver in an AMR system can be accomplished by using an encoded preamble at the beginning of each transmission. A correlator is then used to synchronize an incoming sampled data stream with a known sync pattern once a phasing arrangement partitions the sampled data stream into a first and second sampled sequences. In a wireless meter reading system, for example, where cost and battery power are central concerns, undesirable consequences of stabilization circuitry can erect a significant manufacturing and system design barrier.

One challenge faced by designers of wireless meter reading systems involves providing adequate coverage with transceivers located in the field that are receiving data from metering units that will be transmitted back to the utility. Current meter reading systems use high sensitivity receivers placed on utility poles to read as many meter modules as possible. These receivers are expensive and therefore must cover a large area. Signal multipathing and attenuation due to buildings, fences, and other structures cause holes in the coverage area. In order to fill these holes, additional receivers have to be placed in the coverage area, increasing the cost of the system. Additional transceivers may also be needed to provide reliable communications with meter modules located near the periphery of the coverage area and in only marginal communications range of a presently installed system transceiver. As housing development expands the areas needing communications coverage, utilities can experience the problem of overcapacity—that is, investing in expensive transceivers having high-sensitivity, high-capacity receivers for servicing new developments having far fewer meter modules than such receivers can accommodate. A goal in designing these systems is to achieve a balance of coverage and hardware invested in the meter reading system.

Installation of additional transceivers presents further challenges for utility providers. Typically, system transceivers utilizing high-sensitivity, high-capacity receivers include circuitry that operates continuously, or with high enough duty cycles, and consuming enough power, to require externally supplied electrical energy. In practice, locations determined to be desirable for system transceiver placement often do not have easily accessible line power. Tapping power distribution circuits and running wires dedicated to powering additional system transceivers presents substantial burden and cost for utilities.

Another challenge faced by utilities is the implementation and management of energy-saving load shedding programs. The lack of access to real-time data on the amount of actual energy still being used once load-shedding commands are sent to an electrical load is a typical problem encountered in load shedding program execution. Utilities have no way of knowing if a load shedding command, sent to a designated home or industrial location, has been overridden by the customer. In this example, the utility has no real-time data as to how much energy is actually being preserved in spite of the implementation of load shedding programs.

SUMMARY OF THE INVENTION

According to one aspect of the invention, a home gateway radio frequency (RF) module is adapted for use in an automatic meter reading (AMR) system. As part of the home gateway module, a low cost receiver (LCR) circuit is coupled with an antenna adapted for receiving wireless signals from at least one utility meter endpoint. Also, a digital signal processing (DSP) circuit is interfaced with the LCR circuit and configured to correlate received signals with known signal patterns associated with utility meter endpoint signals utilizing a fast Fourier transform (FFT)-based algorithm. A transceiver circuit is interfaced with the DSP circuit and adapted to wirelessly transmit utility meter endpoint data to a remote memory location.

According to another aspect of the invention, an automatic meter reading (AMR) system includes a plurality of utility meter endpoints, each of which includes a radio-frequency (RF) transmitter adapted for transmitting endpoint information. A plurality of transceivers are adapted to read endpoints located throughout a designated coverage area, and each transceiver adapted to receive endpoint information from utility meter endpoints located within a corresponding portion of the designated coverage area. A central storage arrangement is adapted to communicate with each of the transceivers and to store endpoint information in a central database. The AMR system also includes a low cost receiver (LCR) having a communications range that defines a gap-filling coverage area. The LCR is adapted to automatically forward received endpoint information to the central storage arrangement.

According to another aspect of the invention, an automatic meter reading (AMR) communications system has a plurality of endpoints, at least one central reader having a communications range that defines a designated coverage area and adapted to receive information from endpoints located in the designated coverage area, and a utility database adapted for storing at least some of the received endpoint information. A method of improving AMR system coverage includes providing a low cost receiver (LCR) in a fixed location having a communications range that defines a secondary coverage area. The LCR is operated to (a) wirelessly receive information transmitted from any endpoints located in the secondary coverage area, and (b) transmit at least a subset of the received endpoint information for integration into the utility database.

According to another aspect of the invention, a transceiver for use with an automated meter reading (AMR) system includes a low cost receiver (LCR) circuit, a transmitter circuit, and a microcontroller adapted to be coupled to the LCR and the transmitter circuits. The microcontroller is further adapted to execute a software program that causes the auxiliary transceiver to automatically receive endpoint information transmitted by endpoints within communication range of the transceiver, transmit at least a subset of the endpoint information to a utility database, and perform load shedding command activity.

BRIEF DESCRIPTION OF THE DRAWINGS

The invention may be more completely understood in consideration of the following detailed description of various embodiments of the invention in connection with the accompanying drawings, in which:

FIG. 7 is a flow diagram illustrating an example method of operating an auxiliary transceiver according to one embodiment of the present invention.

FIG. 8 is a diagram illustrating examples of applications for various embodiments of auxiliary transceivers in the context of the example AMR system of FIG. 5.

Figure 1:
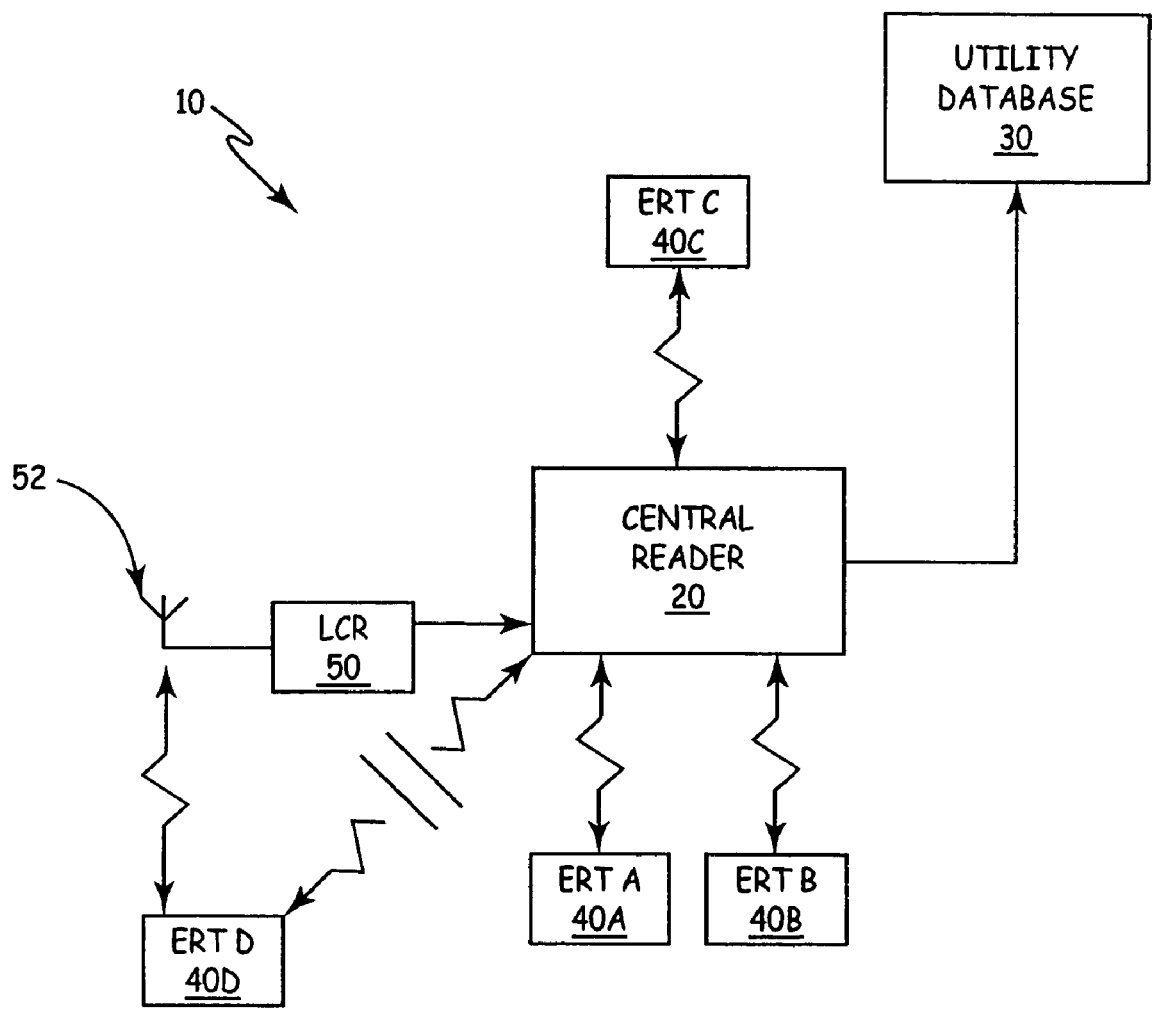
FIG. 1 illustrates a wireless meter reading system that addresses a gap-coverage deficiency according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The invention is generally directed to a method and a system for collecting data from meter modules that are not read by a corresponding transceiver that is configured to read all of the meter modules in a designated area, wherein the transceiver is assigned by the central utility to the designated area. While the invention is not necessarily limited to such an application, the invention will be better appreciated using a discussion of example embodiments in such a specific context.

In one example embodiment, a system for generating feedback to a central utility station performing selective load shedding of a plurality of electrical loads is disclosed, wherein each of the electrical loads is connected to a meter module adapted to measure the electricity consumed by the electrical load. The system includes a plurality of encoded reader transmitters (ERTs, or endpoints), each associated with a meter module, and at least one receiver module adapted to be communicatively connected to the central utility station and to at least one of the electrical loads via at least one endpoint. The receiver module is associated with at least one electrical load and is adapted to execute a load shed command received from the central utility station. The receiver module also receives consumption data from the meter module post execution of the load shed command and transmits the post execution consumption data to the central utility station.

In another example embodiment, a low-cost receiver (LCR) is placed in close proximity to a meter module for receiving the information; the lower the cost of the receiver the more receivers that can be distributed to improve the coverage area and the reliability read for local modules. Since the modules will be relatively close to the LCR, high sensitivity is not required. The LCR of the invention is comprised of a filter electrically coupled to an amplifier and filter stages feeding a simple diode detector. The diode detector in turn is electrically coupled to a post-detection filter. This approach effectively eliminates the need for the local oscillator and mixer in most current radio designs, thereby substantially reducing the cost of the receiver. In one application the cost of the RF front end is about one-tenth the cost of the regular transceiver. The demodulated signal is then fed to an A/D converter that is coupled to a low-cost digital signal processor (DSP). The DSP decodes the signal using correlation techniques to find the endpoint's preamble and uses RSSI decoding techniques to decode the signal's data packet. A DSP is only one example of many microcontrollers that can be used.

In one application, the receiver is a wide band receiver that is configured to operate without a wake up transmitter. In such a system, the endpoint modules are configured to be bubble-up only modules. If the modules were to be used in a fixed network type installation they could bubble at a slow rate, which would preserve battery life. In a related application, the input of the receiver is closely coupled to power lines, which allows the use of house wiring as an antenna. While it is not appropriate to intentionally put RF energy onto power lines, such energy can nonetheless be recovered. Since there are no oscillators running in the RF front end of the receiver module there is no need to keep the receiver module off of the power lines. In addition, where a wake up transmitter is not used in connection with the receiver module there is no RF energy to couple to the power lines. The receiver is mountable in a collar behind the meter, in a box mounted near the breaker panel, or is configurable to be a module the size of a circuit breaker that snaps into a breaker panel. Mounting close to the electric endpoint and using the house wiring as an antenna would result in very close coupling between the receiver module and the endpoint.

Figure 2:
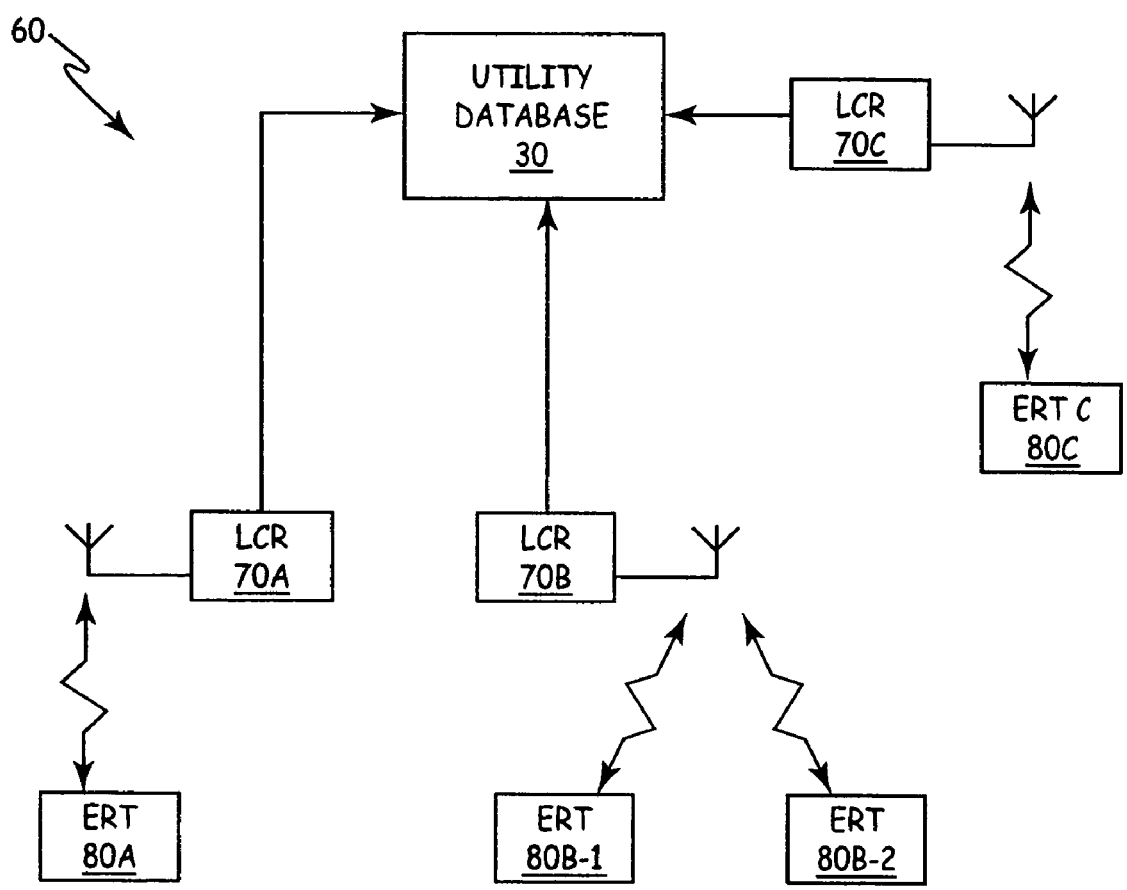
FIG. 2 illustrates a wireless meter reading system with improved gap-coverage and that is usable in a load-shedding system.

Referring now to FIGS. 1 and 2, there are illustrated two approaches to using the receiver module of the invention to provide gap-coverage in a system having a transceiver (FIG. 1) and to substitute for the transceiver and communicate directly with the central utility station (FIG. 2), respectively. In this example embodiment of an AMR system 10, there is included a central reader or transceiver 20 that is communicatively coupled to a utility database 30 at a central utility station. AMR system 10 also includes a plurality of endpoints 40A-40C that transmit consumption data from utility meters in the field to transceiver 20. AMR system 10 further includes a low cost receiver (LCR) module 50 with an antenna 52 that is positioned adjacent an endpoint 40D that is failing to have its data transmitted to the central utility station.

In this example embodiment, there is also disclosed a method for improving gap coverage in data collection in an AMR system that has at least one transceiver that receives data from a plurality of meter modules via endpoints. Transceiver 20 transmits consumption data to a utility station having central utility database 30, database 30 being configured to store a unique identification code for each of the meter modules (and/or endpoints) in the system 10. Consumption data that is collected by the individual endpoints 40A-40D is first transmitted to central utility database 30 via transceiver 20. The consumption data associated with each meter module 40A-40D is correlated with the identification codes in utility database 30 and a determination is then made as to which endpoints 40A-40D, if any, did not respond (i.e., no consumption data was received by the central utility database 30). A data collection error is then assigned to the endpoint 40D, for example, from which data was not received by a central utility server-managing database 30. To fill the gap in data collection coverage, a low cost receiver (LCR) module 50 is positioned adjacent to endpoint 40D assigned the data collection error and LCR 50 transmits the data received from the endpoint 40D to transceiver 20. In this example embodiment, LCR 50 is comprised of a filter followed by an amplifier coupled to filter stages feeding a diode detector. The receiver module 50 can omit a local oscillator and a mixer due to its proximity to the endpoint 40D.

Referring now to FIG. 2, there is illustrated a wireless meter reading system 60 with improved gap-coverage capability that is usable by a utility in a load-shedding system. In one example embodiment, system 60 includes utility database 30 that stores identification data of the meter modules and of endpoints 80A, 80B1-80B2 and 80C in the system 60. Improved gap coverage is obtained by substituting the main transceiver with the LCR modules of the invention. In particular, LCR 70A transmits consumption data received by endpoint 80A directly to utility database 30, while LCR 70B transmits consumption data received by endpoints 80B1 and 80B2, and LCR 70C transmits consumption data received by endpoint 80C directly to utility database 30, respectively.

The LCRs 70A-70C can transmit the consumption data via a wired or a wireless network to the utility server running database 30. In a wireless network embodiment, for example, the transmitted signals can be amplitude-modulated signals or frequency modulated signals, depending on the system and the LCR 70A-70C configuration. LCR 70A-70C embodiments are described in further detail below, with reference to FIGS. 3 and 4.

In a related embodiment, system 60 generates feedback to a central utility station 30 performing selective load shedding of a plurality of electrical loads connected to a meter module. Endpoints 80A-80C are each associated with a corresponding meter module while at least one LCR 70A, for example, is adapted to be communicatively coupled to the central utility station 30. LCRs 70A-70C associated with the electrical load are each configured to execute a load-shed command received from the central utility station 30 and to receive consumption data from the meter module post-execution of the load shed command. LCRs 70A-70C are adapted to transmit the post-execution consumption data to the central utility station 30.

In this example, LCR 70A cooperates with the utility station 30 to perform load-shedding activities in a closed loop manner. In particular, a load-shed command is sent to at least one of the electrical loads to transition from a first state (e.g., running at full power) to a second state (e.g., running at reduced power). In response to the load shed command, electricity consumption data of the electrical load in the first state is stored and a transition of the electrical load to the second state is initiated. Consumption data from the meter module connected to the electrical load is received by LCRs 70A-70C and consumption data of the first state is compared with consumption data received post initiation of the load-shed command. Consumption data of the second state of the electrical load is then stored, where the consumption post load-shed initiation is less than the first state consumption data. The second state consumption data is then transmitted to the central utility station 30, thereby indicating that the electrical load is in the second state and confirming the load-shed command. In another application, the second state for the load is to have the load shut off or taken off line.

In another related embodiment, there is disclosed a method of collecting data in an AMR system having a plurality of meter modules and transmitting the data to a central utility database. The method comprises receiving via an LCR a radio frequency signal from at least one of the meter modules disposed adjacent the LCR and decoding the received radio frequency signal via a correlating technique to find a signal preamble. A data packet within the received radio frequency signal is decoded via a received signal strength indicator (RSSI) decoding technique and then a data transfer is initiated from the receiver module to the central utility database. The data transfer includes transmitting decoded data from the receiver module to the central utility database via a communications network.

In a related embodiment, a local receiver behaving as a virtual endpoint would act as a two-way endpoint for any of the endpoints that are in its domain. The receiver would only receive the standard endpoint packet but could be configured to work as a demand meter for advanced meter functionality. The radio, or "Home Gateway," module could perform two-way functions such as disconnects and monitor the effects of load shedding. This would allow a migration path for existing installations. The next-generation infrastructure could be developed from the radio up to a central utility station while today's endpoints continue to be deployed because the modules are low power devices and do not create interference with adjacent installations.

The next requirement is to get the data out of the LCR, which could be done using a "Home Gateway" by calling out on the telephone. Another method of accessing the data uses standard wide area network solutions such as the 802.11 standard or Bluetooth; a proprietary RF link could also be developed for this purpose. This link would be a high power two-way link to a device like a high-powered transceiver. A cellular digital packet data (CDPD) modem could also be used directly from the receiver module. Where the "Home Gateway" approach is used, remote load switching modules can be controlled via a power line carrier, a short haul RF link, or a direct connection. Because the radio could be closely coupled to the electric endpoint, highly reliable reads are attainable. Where readability of the electric endpoint is guaranteed, the reader could implement a virtual demand meter; the demand reset can then occur in the radio module. If the electric endpoint is a 41 series endpoint bubbling at a one second rate, for example, then the time accuracy would be within one or two seconds.

Figure 3:
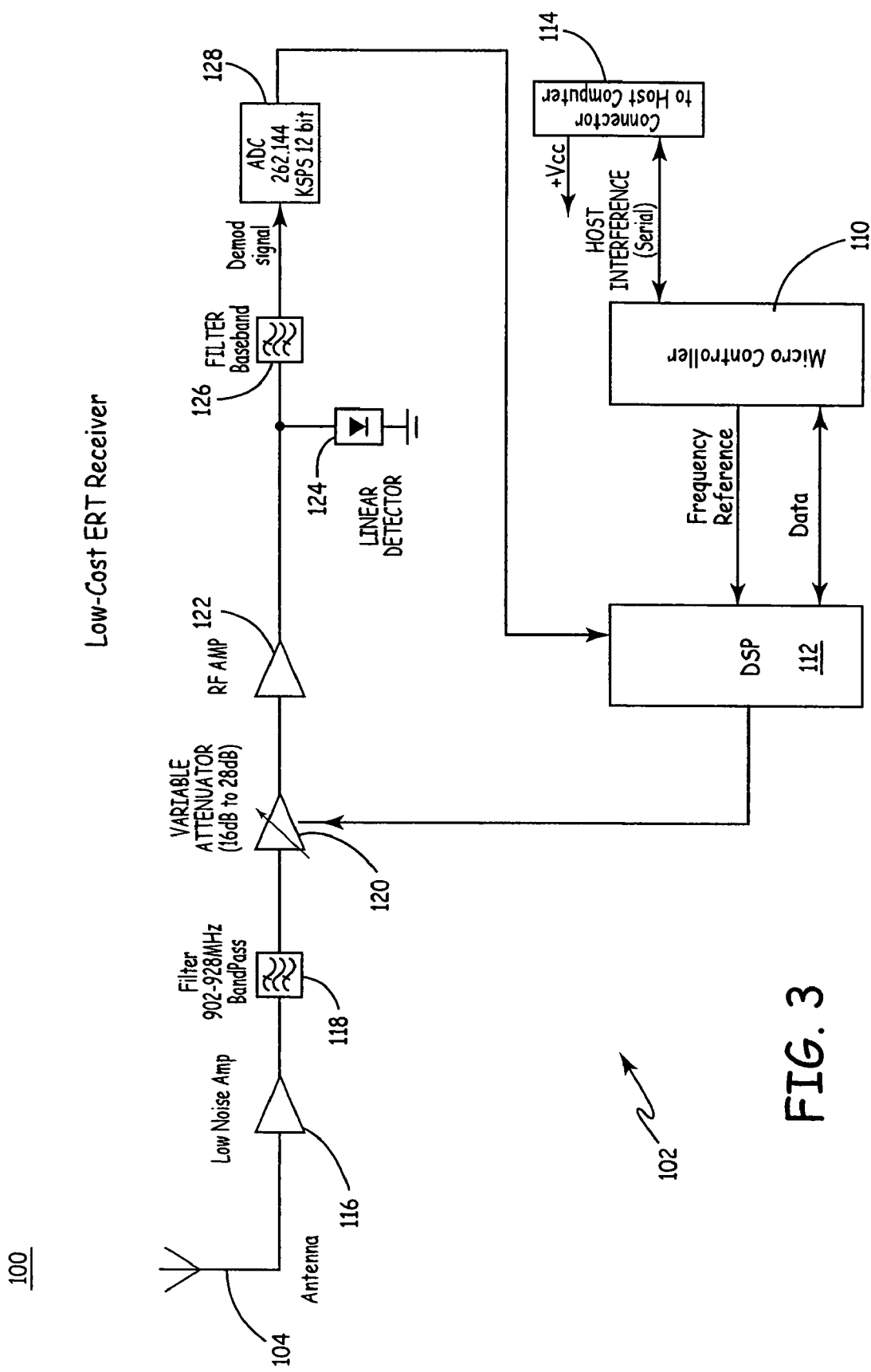
FIG. 3 is a basic schematic diagram of a front end of a low cost receiver module according to one embodiment of the invention.

Referring now to FIG. 3, there is illustrated a basic schematic diagram of a front end of an LCR module 100 according to one embodiment of the invention. A receiver board 102 is used to receive the modulated signals, which in this example are the frequency hopping spread spectrum (FHSS) signals, through an antenna 104. Receiver module 100 includes a microcontroller 110, such as an 8051 microcontroller, and a signal processor 112, preferably a digital signal processor (DSP). Controller 110 directs data and commands to and from DSP 112 and host computer 114. DSP 112 is preferably a DSP chip from TEXAS INSTRUMENTS, although other compatible DSP chips known to those skilled in the art can also be used. DSP 112 is the mathematical calculator for the correlator and decoder, which switches in and out the attenuation of the front-end amplifier. Receiver 100 implements a low noise amplifier 116 electrically coupled to a filter 118 that is in turn electrically coupled to a variable attenuator 120 followed by an RF amplifier 122. This configuration brings incoming endpoint packets to the decoder. For a moderate additional cost the circuit 100 can include an FFT engine.

In previous FHSS meter reading systems of the assignee Itron, Inc., the receiver was designed to sample bit sliced data from the detector output to look for endpoint packets. Receiver 102 also samples the output of the detector but without bit slicing the data. The preamble of the endpoint packet is always the same, that is, receiver 102 knows what to look for to see the start of a packet. This allows the receiver to use correlation techniques, as preferably implemented by a correlator. In accordance with one embodiment of the invention, a correlator comprises a circuit, or a processor or controller, programmed to compare the incoming stream of bits to the known values as designated in the message. In the embodiment shown in FIG. 3, the correlator is implemented in DSP 112. The correlator gives low values of correlation until an ongoing (preferably over approximately twenty bits) match is perceived. In this case, the correlator output becomes very high. Therefore, in this embodiment of the invention, there is no guessing whether the data packet is a valid endpoint packet because the correlator enables the receiver 100 to know whether the data packet is a valid endpoint packet (within the statistical probability of a false match). Further, the receiver 100 has an accurate timing of the packet bit stream, allowing it to decode the remaining portions of the data packet in the center of each bit, which increases the number of cleanly decoded packets. With a correlator implemented as described, the receiver 100 can actually detect the presence of a valid packet below the base level of noise (commonly referred to as looking into the noise).

As depicted in FIG. 3, LCR 100 also comprises a linear (diode) detector 124 electrically coupled to a filter 126 and an analog-to-digital (A/D) converter 128 that feeds DSP 112. In a related embodiment, linear detector 124 is omitted and A/D converter 128 comprises a high-speed A/D converter so as to enable LCR 100 to receive and decode frequency-modulated signals.

In yet another related embodiment, a low cost receiver is configured to provide the same functionality of LCR 100 while omitting the connection to a host computer and eliminating the need for a microcontroller (such as microcontroller 110) and the need for host computer 114.

Figure 4:
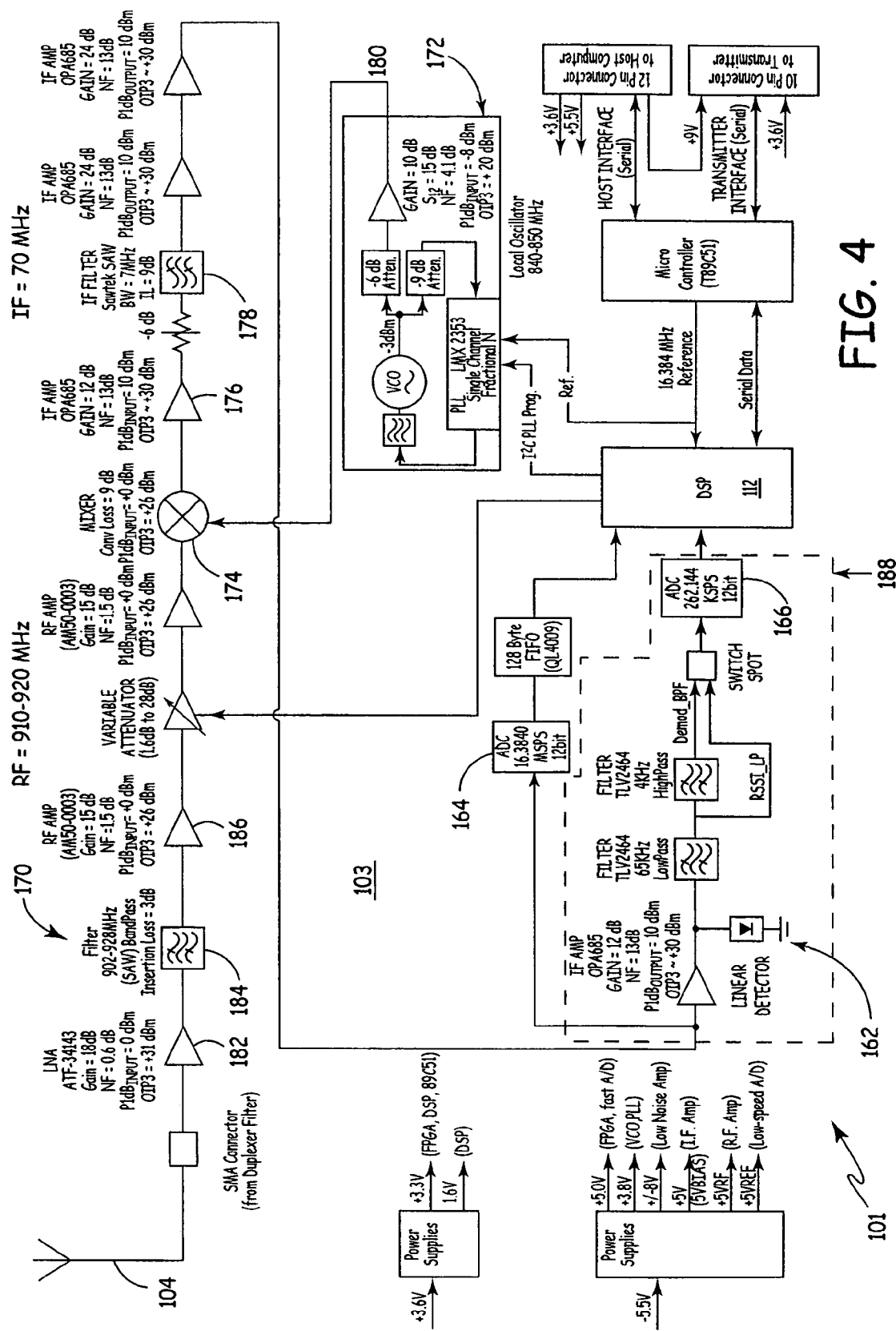
FIG. 4 is a schematic diagram of another embodiment of a receiver module that is configurable to receive frequency-modulated signals for the system in FIG. 1.

Referring to FIG. 4, a circuit diagram of a receiver module 101 will be described that is reconfigurable to receive FM signals. The primary components of receiver board 103 of FIG. 4 are linear detector circuitry 162 in electrical communication with analog to digital (A/D) converters 164, 166 connected to DSP 112, an IF frequency generator 172, and a mixer 174 in electrical communication with IF amplifier 176 and filter 178. An RF signal is received by antenna 104 in the range of 910-920 MHZ and IF frequency generator 172 generates a frequency in the range of 840-850 MHZ in one embodiment. To create the IF signal 180, IF frequency generator 172 signal is low side injected to mixer 174. Following the use of the mixer 174, an IF amplifier 176 and IF filter 178 are utilized to create the 70 MHZ IF signal. This signal is then fed into DSP 112 after passing through high-speed A/D converter 164 and low-speed A/D converter 166. High-speed A/D converter 164 samples the 70 MHZ signal. This is under-sampling the signal, which is the digital equivalent of a mixer. Under-sampling translates the 70 MHZ IF to base band. The samples are then fed into DSP 112, which runs a 64-point fast Fourier transform (FFT); the 64-point FFT creates thirty-two unique frequency bins, each 256 KHZ wide, in this embodiment.

The components of the receiver board 103 of FIG. 4 also include an RF amplifier section 170 that is comprised of a low noise amplifier (LNA) 182 in electrical communication with an RF amplifier 186 via a surface acoustic wave filter (SAW) 184. In this embodiment, LNA 182 has an NF of 0.6 db, a P1 dB of 0 dBm, and an IP3 of 31 dBm. RF amplifier 186 has an NF of 1.5 dB, gain of 15 dB, P1 dB of 0 dBm, and IP3 of 26 dBm. Mixer 174 has a CL of +9 dB, a P1 dB of 15 dBm, and IP3 of 0 dBm. IF amplifier 176 has a P1 dB of 10 dBm and IP3 of 30 dB in this embodiment, and IF filter 178 has a bandwidth of 7 MHZ and an IL of 9 dB. High-speed A/D converter 164 is preferably a 12-bit converter operating at a rate of 16.384 MSPS, while the low-speed A/D converter 166 is a 12-bit converter that operates at a rate of 262.144 KSPS in this embodiment.

When the correlator compares a known data pattern with sampled data, the preferred sampling rate is eight times the data rate, in this example 262.144 kHz. This sampling is done by low-speed 12-bit A/D converter 166 electrically coupled to the RSSI (linear detector) 162 of the IF and the DSP 112. When a correlation occurs, the correlator output is synchronized to within one-eighth of a bit. This starts the timing for decoding the rest of the packet from this time. Decoding of the packet uses the center three quarters of each bit and the first one-eighth and the last one-eighth of each bit is discarded due to uncertainty. One particular advantage of this embodiment is that it enables the invention to accomplish effective data sampling at a rate less than the sampling rate dictated by the Nyquist theorem (i.e., sampling must occur at more than twice the effective data transfer rate). In one sense, the correlator effectively allows the decoder to operate as a synchronous power detector for the wideband signal.

In a related example embodiment, the addition of a high-speed A/D converter 164 and a change to a higher performance DSP for a modest cost allows the receiver 101 to decode endpoints as a channelized receiver. A primary requirement for FCC part 15.247 of the receiver hopping in synchronization with the transmitter can be addressed by using a multiple channel radio to ensure decoding an endpoint on any channel. Use of FFT in the disclosed receiver module results in a channelized radio. Where the receiver is FCC part 15.247 compliant high-powered endpoints can be read, thereby increasing the coverage area.

In another embodiment related to the receiver module 101 of FIG. 4, a reconfigured version of module 101 is adapted to operate in a frequency-modulated (FM) signal-receiving mode. In desired applications, FM signals can prove more robust and less susceptible to interference. The LCR 100 and reconfigured receiver module 101 of the invention would therefore further improve the coverage area and read reliability in particular applications. In this mode, reconfigured receiver 101 receives FM signals via antenna 104, and decodes FM signals sent from the endpoints. In this reconfigured embodiment, linear detector 162, low-speed A/D converter 166, and associated components 188 are omitted, leaving high-speed A/D converter 164 the only input to DSP 112 when operating in a FM signal-receiving mode.

In another example embodiment, a receiver has a sensitivity of around −103 dBm, which is adequate for reading endpoints in a local area, possibly one house deep. Since the receiver is wide band it can be susceptible to interferes, however such susceptibility is reduced by reducing the sensitivity of the receiver and increasing the power of the endpoint. Other approaches include reducing the sensitivity and accepting a reduced coverage range or adding some cost by increasing the filtering to the RF front end.

Figure 5:
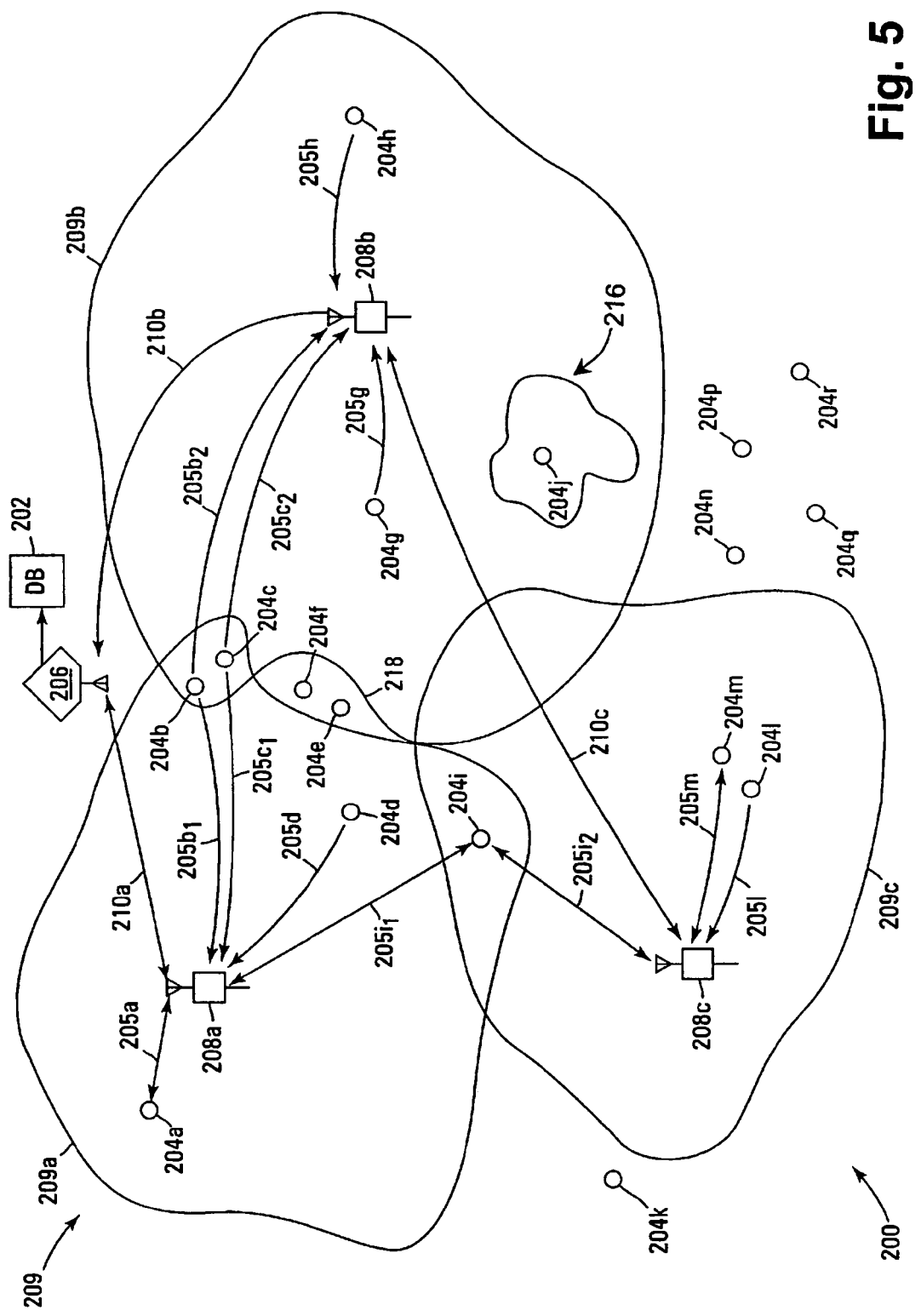
FIG. 5 is a diagram illustrating an example AMR system in which utility meter endpoints are capable of two-way communication.

Applications for AMR Systems Having Utility Meter Endpoints With Two-Way Communications Capability One aspect of the invention is directed to communications coverage improvement or extension in AMR systems in which utility meter endpoints have the capability of bi-directional communication. FIG. 5 illustrates one example embodiment of an AMR system, which is generally indicted at 200. AMR system 200 includes a central utility database 202 that ultimately receives utility consumption information from the plurality of individual utility meter endpoints 204a-204r (generally referred to herein as utility meter endpoints 204). Each utility meter endpoint 204 includes a radio transceiver (or ERT-encoder reader transmitter) that can be communicatively coupled to the utility database 202 via an AMR communications infrastructure that includes a central transceiver (or collector) 206. Central transceiver 206 receives transmitted consumption information corresponding to each utility meter, converts the information into a form usable by database 202, and forwards the information to database 202.

Central transceiver 206 is not illustrated in FIG. 5 as communicating directly with meter endpoints 204. However, in a related embodiment, central transceiver 206 is adapted to communicate with at least some of meter endpoints 204. In example AMR system 200, most of utility meter endpoints 204 communicate consumption information to central transceiver 206 via intermediate transceivers 208a, 208b, and 208c (generally referred to herein as intermediate transceivers 208). In one embodiment, intermediate transceivers 208 receive consumption information in the form of RF telemetry data from utility meter endpoints 204 located within their RF communications range, and re-transmit the information to central transceiver 206 over a corresponding communications channel. In one embodiment, the communications channel is a wireless RF link such that intermediate transceivers 208 operate in the nature of RF repeaters. Physically, such an embodiment can be implemented by intermediate transceivers 208 each including a highly directional antenna pointed at the central transceiver and driven by a suitable transmitter having sufficient power to ensure a desired level of transmission reliability. In another embodiment, the communications channel includes a wired network. Data communication from intermediate transceivers 208 can be bi-directional, as represented by communication 210a between intermediate transceiver 208a and central transceiver 206; or unidirectional, as represented by communication 210b from intermediate transceiver 208b to the central transceiver 206. Also, communication can be relayed from one intermediate transceiver 208c to another intermediate transceiver 208b, and ultimately to central transceiver 206, as represented by communication 210c between intermediate transceivers 208c and 208b, and communication 210b from intermediate transceiver 208b to central transceiver 206.

Each intermediate transceiver 208 is installed in a fixed location and has a limited communications range for communicating with utility meter endpoints. Therefore, each intermediate transceiver is capable of communicating only with utility meter endpoints located in its coverage area. As illustrated in FIG. 5, intermediate transceivers 208a, 208b, and 208c have coverage areas 209a, 209b, and 209c, respectively. Together, intermediate transceivers 208a, 208b, and 208c service a principal coverage area generally indicated at 209. Intermediate transceivers 208 have high-capacity, high sensitivity RF receivers. In order to service large numbers of utility meter endpoints, the receivers are configured to operate during a majority of the time. Because such receivers consume a relatively large amount of power, intermediate transceivers 208 are typically installed with externally supplied power, such as from the AC mains. In one embodiment, each intermediate transceiver 208 is capable of communicating with, or servicing, hundreds or even thousands of utility meter endpoints in its corresponding coverage area. Examples of communications between utility meter endpoints 204 and intermediate transceivers 208 are illustrated in FIG. 5 and generally indicated at 205. For instance, utility meter endpoint 204a communicates with intermediate transceiver via communications link or signal 205a.

Coverage areas 209a, 209b, and 209c have overlapping portions, such as the coverage area portions that include utility meter endpoints 204b, 204c, and 204i. Each of these utility meter endpoints is within communications range of more than one intermediate transceiver 208, and indeed communicates with more than one intermediate transceiver 208. For example, utility meter endpoint 204b communicates with intermediate transceiver 208a via communications link $205b_1$, and with intermediate transceiver 208b via communications link $205b_2$. Likewise, utility meter endpoint 204c communicates with intermediate transceiver 208a via communications link $205c_1$, and with intermediate transceiver 208b via communications link $205c_2$; and utility meter endpoint 204i communicates with intermediate transceiver 208a via communications link $205i_1$, and with intermediate transceiver 208c via communications link $205i_2$. In one embodiment, each of the intermediate transceivers 208 is unaware of message duplication within the system. Thus, when more than one intermediate transceiver 208 receive the same message containing utility meter information, each intermediate transceiver processes the message in its usual manner, and forwards the utility meter information to central transceiver 206 and database 202, which is ultimately responsible for sorting out redundant units of information. This characteristic of example AMR system 200 permits the use of additional, and potentially duplicative, intermediate-level transceivers.

When communicating with an intermediate transceiver 208, each utility meter endpoint 204 can use unidirectional communication, such as the communications link 205*l* from utility meter endpoint 204*l* to intermediate transceiver 208c, or bidirectional, such as communication link 205*m* between utility meter endpoint 204*m* and intermediate transceiver 208c. Because the communications modules in the utility meter endpoints 204 are typically battery powered, it is desirable for the AMR system to minimize the number of transmissions required for the utility meter endpoints 204 to transmit their consumption information. To this end, in one embodiment, utility meter endpoints 204 utilize an infrequent bubble-up mode of occasional data transmission where a utility meter automatically wakes up according to a random, quasi-random, or predetermined time interval and begins transmitting its telemetry-gathered data.

Each communication associated with a bubble-up event can itself be either unidirectional or bi-directional. In the case of a bi-directional communication, in one embodiment, the flow of information is usually from the utility meter endpoint 204 to the corresponding intermediate transceiver 208, such that the data bits originating at the intermediate transceiver 208 and received by utility meter endpoint 204 are used for implementing the transport layer protocol (for example, frame preamble bits, parity bits, acknowledgement frames, etc.).

In an alternative embodiment, bidirectional communications are utilized to transmit information from the AMR system infrastructure to one or more utility meter endpoints 204. In another embodiment, as an alternative to a bubble-up scheme, bi-directional communications are used to prompt one or more utility meter endpoints to initiate data transfer of consumption information (or metered data). In another embodiment, utility meter endpoints 204 are capable of operating in one or more differing modes, such as in a bubble-up mode at certain times, and in a prompt-response (or wake-up) mode at other times.

In one embodiment, one of the utility meter endpoints 204 that is receptive to inbound communications includes low-power intermittently-operating receiver circuitry for detecting the presence of a signal having predefined properties characteristic of an inbound communication addressed to a specific meter endpoint or to a group of meters to which that specific meter endpoint (or targeted endpoint) belongs. When such a signal is detected, the receiver circuitry causes the utility meter endpoint to power the receiver circuitry for a sufficient time to receive and decode the inbound communication. In one example embodiment, a utility meter endpoint 204 operates intermittently in a signal detect mode for several milliseconds every 10-20 seconds. Between detection operations, the circuitry is in an extremely low-power-consuming standby mode. In one embodiment, the low-cost receiver circuitry described above with respect to FIG. 4 is utilized in each utility meter endpoint 204.

In example AMR system 200, utility meter endpoints 204 are capable of bubble-up, as well as prompt-response or wake-up modes of communication. In one embodiment, utility meter endpoints 204 typically operate in a bubble-up mode; however, the diversity of available operating modes permits the AMR system to be highly adaptable to any changing operating requirements or conditions. For example, utility meter endpoint 204g occasionally transmits its consumption information to intermediate transceiver 208b via communication link 205g, which occurs at random variations about a predetermined interval. The utility provider may wish to communicate with utility meter endpoint 204g at an additional instance.

Figure 6:
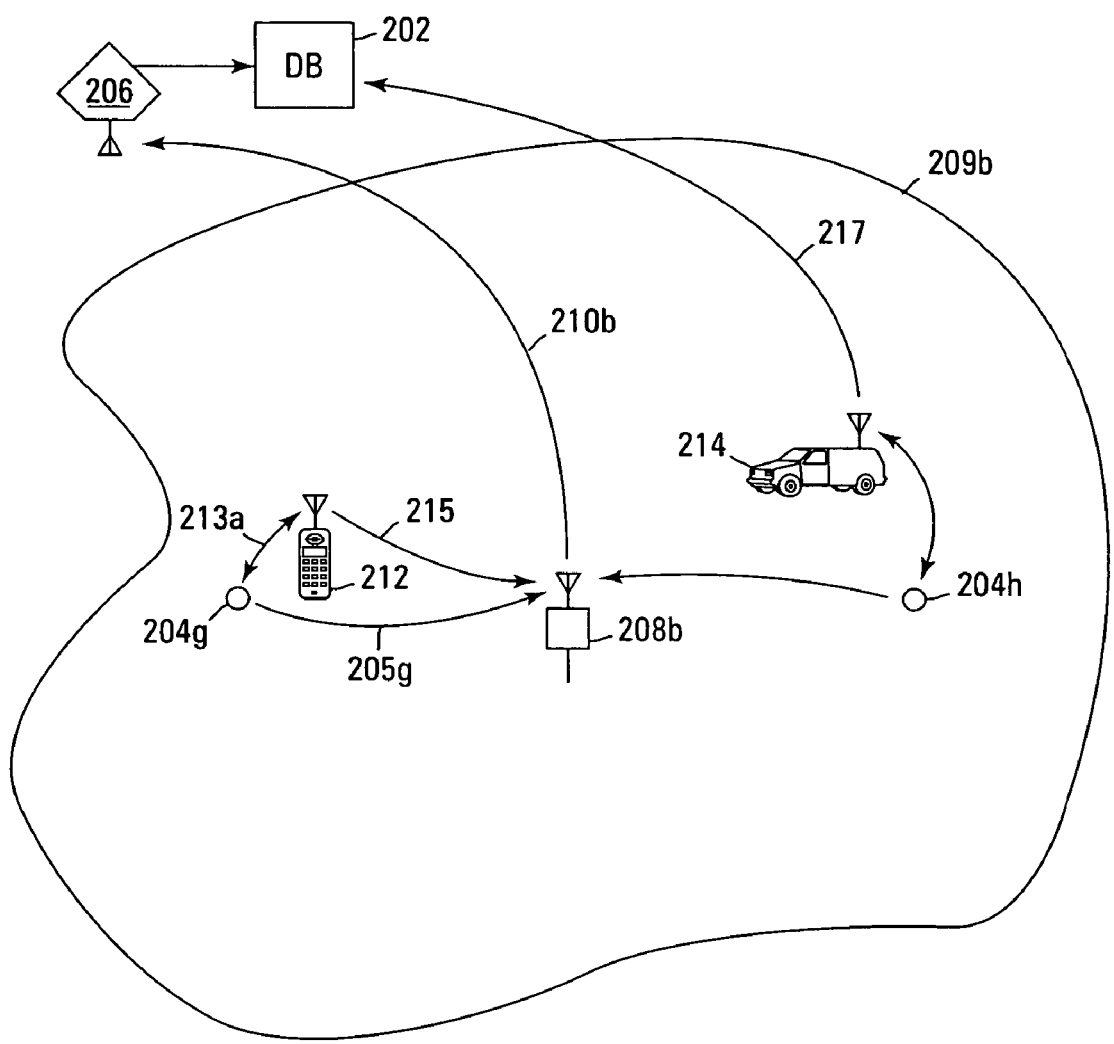
FIG. 6 is a diagram illustrating examples of portable and mobile meter reading devices in the context of the AMR system of FIG. 5.

FIG. 6 illustrates examples of communications devices that are not a part of the infrastructure of AMR system 200. A portable communicator 212 provides a way for a human meter reader or technician to communicate in close proximity with utility meter endpoint 204g at a desired time. Portable communicator 212 initiates RF communication 213a by transmitting a message, in response to which utility meter endpoint 204g wakes up and transmits a reply message. In this way, portable communicator 212 can be used, for example, to read consumption or other information from utility meter endpoint 204g, or to reconfigure utility meter endpoint 204g. Portable communicator 212 can relay information received from utility meter endpoint 204g to central transceiver 206 and utility database 202 via communication link or signal 215 to intermediate transceiver 208b, which in turn is relayed via communication 210b from intermediate transceiver 208b to central transceiver 206. In this example embodiment, portable communicator 212 is a human-operated, battery-powered device and is typically not adapted for long-term automatic operation (i.e., without human intervention) such as equipment typically used in fixed AMR networks.

Utility personnel may also operate a mobile communicator 214, also illustrated in FIG. 6, which can initiate RF communications with a utility meter endpoint, such as utility meter endpoint 204h, and later transfer information obtained from the meter endpoint to utility database 202. In another embodiment, mobile communicator 214 is mounted on a street vehicle and coupled to a portable data collector. Data received by mobile communicator 214 and collected by the data collector can later be transferred to utility database 202 via a data transfer transmission 217. Because portable communicator 212 and mobile communicator 214 are designed to operate at a relatively close range to the utility meter endpoints with which communicators 212, 214 are communicating, their receiver circuitry can be of a type that has low sensitivity and a low cost.

Referring again to FIG. 5, the principal coverage area 209 of example AMR system 200 has a finite outer limit. Coverage area 209 also has gaps 216 and 218 in coverage. Gap 216 is a void within coverage area 209b, and is therefore an area outside of the principal coverage area 209. Gap 218 is outside the boundary of coverage areas 209a and 209b at a location where the boundaries have failed to overlap. Utility meters 204e, 204f, 204j, 204k, 204n, 204p, 204r, and 204q are all located outside of principal coverage area 209, and cannot be serviced by the installed principal infrastructure that includes intermediate transceivers 208. Although portable communicator 212 and mobile communicator 214 (FIG. 6) could be deployed to service these utility meters, doing so involves committing human resources to the field to operate the mobile devices 212 and 214, which is a costly and time-consuming endeavor.

According to one aspect of the invention, one or more low-cost auxiliary transceivers, such as auxiliary transceivers 220a, 220b, 220c, 220d, and 220e illustrated in FIG. 8 (generally referred to herein as auxiliary transceivers 220) can be installed to supplement the communications infrastructure of AMR system 200 to provide communications service for utility meter endpoints located outside all of coverage area 209 boundaries, or located in a coverage gap. An auxiliary transceiver 220 is similar in principle to the LCR embodiments described above in that it can be used as a communications repeater for extending or improving communications coverage in an AMR system. Each auxiliary transceiver 220 includes at least one radio transceiver and at least one antenna for communicating with utility meter endpoints 204, and with the AMR system communications infrastructure. Each auxiliary transceiver 220 also includes a CPU that governs operation of the auxiliary transceiver. In one embodiment, the transmission to the AMR communications infrastructure is directed to a nearby one or more intermediate transceivers 208. In an example of the AMR system operation, each auxiliary transceiver 220 communicates with utility meter endpoints 204 that are located within its auxiliary coverage area, wirelessly receives their consumption and other information destined ultimately to utility database 202, and wirelessly transmits the information to the AMR communications infrastructure via one or more intermediate transceivers 208.

Auxiliary transceiver 220 differs from the LCR embodiments described above in that certain embodiments have features and operability that enable auxiliary transceiver 220 to interface with utility meter endpoints having two-way communications capabilities, and utilize this ability to operate with sufficiently low power consumption to enable operation without externally-supplied power. In one embodiment, auxiliary transceiver 220 is powered by at least one battery that is on-board, or integrally housed with the auxiliary transceiver. The use of on-board power greatly facilitates locating and installing the auxiliary transceiver in a preferred field location. In one embodiment, a battery-powered auxiliary transceiver 220 can operate for up to ten years without maintenance or human intervention. An auxiliary transceiver 220 according to this embodiment can be installed without having to connect to AC mains or other externally supplied power. Avoiding connection to AC power provides substantial savings in installation costs, makes possible installations in locations where AC power is unavailable, saves the cost of electrical hardware needed to make the electrical connections, and saves the cost of electronic hardware needed to condition and convert the mains power into a form suitable for powering the various circuitry. In one embodiment, on-board battery power is supplemented by solar power cells.

FIG. 7 illustrates an example operating sequence 300 of one example embodiment of an auxiliary transceiver. At 302, the auxiliary transceiver is preconfigured and installed in a suitable location to service utility meter endpoints 204 that are outside of coverage area 209. In one embodiment, the pre-configuration includes programming one or more assigned RF channels, the time period between automatic activations, and the duration of each automatic activation. At 304, the auxiliary transceiver self-activates and transmits, or broadcasts, a prompting signal on its assigned RF channel. In this example embodiment, the prompt includes a wakeup sequence of bits to which utility meter endpoints respond by entering an active mode of communication. The prompt can also include a command and control frame according to the system communication protocol. In a related embodiment, the prompt is a fixed sequence that does not vary due to any potentially changing external factors or circumstances.

In one example system operation, all utility meter endpoints that receive the prompting signal, respond to the prompt. In another example system operation, the prompting signal includes an indication that the prompting signal originates from an auxiliary transceiver, and only those utility meter endpoint that are configured to respond to prompts from auxiliary transceivers, respond to the prompt. In another example system operation, utility meter endpoints are each assigned to at least one communications group; and the prompting signal includes a communications group ID. Only those utility meter endpoints that have a communications group membership corresponding to the group ID in the prompt, respond.

At 306, the auxiliary transceiver activates its receiver circuitry by exiting a low-power standby mode, and listens for a pre-configured time duration for any transmissions responsive to the broadcast prompt. At 308, if any responsive messages are transmitted, the auxiliary transceiver receives them, and stores them in memory at 310.

At 312, the auxiliary transceiver pauses. In one embodiment, the pause is for a random time duration not exceeding 10 minutes. In one embodiment, during the pause, the auxiliary transceiver energizes its transmitter circuitry in preparation for sending the received information to the AMR system infrastructure. At 314, the auxiliary transceiver retrieves the first stored message from memory, transmits the message to an intermediate transceiver of the AMR system, and deletes the message from its memory. In this embodiment, the transmitted message includes additional forward error correction or other suitable transport layer improvement. In a related embodiment, the transmission by the auxiliary transceiver is in a one-way communications mode, in which the auxiliary transceiver does not require any communication from any intermediate transceiver. In an alternative embodiment, the communications between the auxiliary transceiver and the intermediate transceiver are in a 1.5-way communication mode, in which the auxiliary transceiver requires some degree of responsiveness from the auxiliary transceiver, such as frame receipt acknowledgements (ACKs). In another alternative embodiment, communications between the auxiliary transceiver and the intermediate transceiver are in a two-way communication mode, in which the auxiliary transceiver transmits endpoint information in response to prompting signals from the intermediate transceiver that are directed to utility meter endpoints and seek endpoint data.

If there are more messages in memory (316), the auxiliary transceiver retrieves those messages in sequence, and transmits each message (318) in the same manner as described above at 314. After all messages have been sent, the auxiliary transceiver enters a low-power standby mode and counts down until the next activation cycle (320, 322).

The low power standby mode permits auxiliary transceiver 220 to significantly conserve power. In this example embodiment, auxiliary transceiver 220 is in a low power standby mode for over 50% of the time. For example, auxiliary transceiver 220 can operate in a low power mode more than 99% of the time, and operate in active receiving, transmitting, and processing modes the remaining 1% of the time. In this example embodiment, active operation occurs intermittently, at time intervals similar to those associated with bubble-up events of utility meter endpoints 204.

FIG. 8 illustrates several example applications for auxiliary transmitters 220 in the context of the above-described example AMR system 200. Auxiliary transceiver 220a has been installed in coverage area 209a such that its auxiliary coverage area 222a (represented by a dotted line circumscribing auxiliary transceiver 220a) extends into gap 218 sufficiently to provide radio communications with utility meter endpoints 204e and 204f. Auxiliary transceiver 220a also communicates with the AMR infrastructure, as indicated at communications 226a between auxiliary transceiver 220a and intermediate transceiver 208a. Because auxiliary transceiver 220a is located within coverage area 209a, its radio transceiver can have the same capabilities as the mass-produced radio transceivers included as part of utility meter endpoints 204. One advantage that can be realized is low cost of communications hardware in the auxiliary transceivers. In one embodiment, auxiliary transceiver 220a has the same radio communications hardware as a utility meter endpoint 204. For example, auxiliary transceiver 220a can have the same circuit card subassembly as the one installed in the utility meter endpoints, but different embedded software/firmware.

Auxiliary transceiver 220a communicates wirelessly with utility meter endpoints 204d, 204e, and 204f as respectively indicated at communications 224d, 224e, and 224f. In one embodiment, at a predetermined time interval (such as hourly, daily, weekly, etc.), auxiliary transceiver 220a broadcasts an modulated RF prompting signal directed generally at utility meter endpoints 204 located in its area of coverage 222a. In another embodiment, each prompt is broadcast according to a predetermined time interval, plus or minus a random time interval.

Utility meter endpoints 204d, 204e, and 204f each respond to the prompt by transmitting their consumption and other information destined for utility database 202. Utility meter endpoints 204 transmit their information according to a slotted ALOHA or other suitable mode of transmission. In one embodiment, auxiliary transceiver 220a receives each utility meter's information and stores it for later transmission. In another embodiment, auxiliary transceiver 220a receives each utility meter's information and immediately transmits it to the AMR communications infrastructure. One example communications protocol used for such communications is disclosed in U.S. application having Ser. No. 10/915,706, filed on Aug. 10, 2004, entitled "Data Communications Protocol in an Automatic Meter Reading System," which is herein incorporated by reference in its entirety.

Auxiliary transceiver 220a transmits the information obtained from each of the utility meter endpoints 204d, 204e, 204f to the AMR communications infrastructure via communications link 226a, which are received by intermediate transceiver 208a. Communications from auxiliary transceivers 220 to the AMR communications infrastructure are generally referred to herein as communications 226. In one embodiment, transmissions of data communications 226 that are transmitted by auxiliary transceiver 220a are sent according to an ALOHA mode of transmission.

In one embodiment, data communications 226 include separate, discrete transmissions, each corresponding to an individual utility meter's consumption data. Thus, according to this embodiment, data communications 226a include three discrete transmissions separated in time and respectively corresponding to each of utility meter endpoints 204d, 204e, and 204f. In a related embodiment, each discrete transmission of communications 226 is in the same format as the bubbling-up transmissions from utility meter endpoints 204. One advantage of such an arrangement is that no changes or special configuring is needed of the AMR communications infrastructure to accommodate auxiliary transceivers 220. Stated another way, by mimicking utility meter transmissions, the auxiliary transceivers remain transparent to the existing AMR communications infrastructure.

In another embodiment, communications 226 include separate, discrete transmissions, each corresponding to an individual utility meter's data, but each transmission is reformatted to optimize data transmission to intermediate transceiver 208. For example, each transmission can be encoded according to a Bose-Chaudhuri-Hochquenghem (BCH) scheme. In this embodiment, each intermediate transceiver 208 is preconfigured to receive and process transmissions encoded in this format. In a related embodiment, the transmissions can utilize a Manchester-encoding scheme.

In an alternative embodiment, communications 226 are in a single, condensed, transmission. One benefit of condensing the information is a realization of energy savings relative to transmitting the same information in an uncondensed format. In one embodiment, to accommodate this format of communications 226, the intermediate transceivers are configured to handle such communications from other intermediate transceivers 208 (and auxiliary transceivers 220), in addition to handling communications with utility meter endpoints 204.

Auxiliary coverage area 222a includes utility meter endpoints 204e and 204f that are in coverage gap 218, as well as utility meter endpoint 204d that is also located within coverage area 209a. Utility meter endpoint 204d communicates information to intermediate transceiver 208a via communication 205d which, in one embodiment, is transmitted according to a bubble-up scheme. Hence, in the example system operation described above, information from utility meter endpoint 204d is received twice by the AMR communications infrastructure (first, via communication 205d directly from the utility meter endpoint 204d, and second, via a corresponding one of the discrete transmissions in communications 226a from auxiliary transceiver 220a). In one embodiment, intermediate transceiver 208 does nothing to address the issue of duplicity, and instead forwards each communication to the central transceiver in the usual manner as if the duplicative communications corresponded to different utility meters. In this embodiment, utility database 202 operates on each of the received communications to sort out the redundant duplicative sets of meter data based on the information contained in each communication, such as a tag identifying the specific utility meter and time stamp. In other embodiments, the sorting takes place at intermediate transceiver 208, or at central transceiver 206.

Auxiliary transceiver 220b is located in coverage gap 216 in order to provide communications service to utility meter endpoint 204j. Auxiliary transceiver 220b has a coverage area 222b that is sufficient to cover the entire coverage gap 216. However, auxiliary transceiver 220b is itself located outside of coverage area 209b. In order to maintain reliable communications with the AMR communications infrastructure via communications 226b between auxiliary transceiver 220b and intermediate transceiver 208b, auxiliary transceiver 220b can be adapted to communicate at a greater range with intermediate transceiver 208b, as compared with a typical utility meter endpoint 204. In one embodiment, installed auxiliary transceiver 220b includes a high-gain directional antenna that is pointed at intermediate transceiver 208b. In another embodiment, auxiliary transceiver 220b is installed on a high pole or tower to avoid obstructions that can affect electromagnetic wave propagation. In another embodiment, auxiliary transceiver 220b has a more powerful RF transmitter amplifier circuit compared to the transmitter amplifier circuit of a typical utility meter endpoint 204.

Auxiliary transceiver 220c is installed to extend AMR communication system coverage beyond the outside boundary of coverage area 209 in order to provide service to utility meter endpoint 204k. Auxiliary transceiver 220c effectively extends AMR communications system coverage to include auxiliary coverage area 222c. In one embodiment, auxiliary transceiver 220c is also configured to communicate with more than one intermediate transceiver to ensure reliable communications with the AMR system communications infrastructure. As illustrated in FIG. 8, auxiliary transceiver 220c communicates with intermediate transceiver 208a via communications $226c_1$, and with intermediate transceiver 208c via communications link $226c_2$. In one embodiment, auxiliary transceiver 220c includes an omni-directional antenna and a sufficiently powerful transmitter to reach the intermediate transceivers 208a and 208c. In another embodiment, auxiliary transceiver 220c includes transmitter circuitry driving two distinct high-gain directional antennas, each directed at a corresponding intermediate transceivers 208.

In the example expansion of coverage area 209 illustrated in FIG. 8, auxiliary transceiver 220d is used to extend communications service to utility meter endpoints 204n, 204p, 204q, and 204r, which are all located outside of coverage area 209. Auxiliary transceiver 220d provides an auxiliary coverage area 222d that includes these utility meter endpoints. Auxiliary transceiver 220d is also outside of coverage area 209 and, unlike auxiliary transceiver 220c discussed above; auxiliary transceiver 220d is not within communications range of any intermediate transceiver 208. To facilitate communications between auxiliary transceiver 220d and the AMR infrastructure, auxiliary transceiver 220e is located such that it is within communications range of intermediate transceiver 208b as well as within communications range of auxiliary transceiver 220d. As indicated in FIG. 8, auxiliary transceiver 220e provides an auxiliary coverage area 222e that includes auxiliary transceiver 220d. In one embodiment, auxiliary transceiver 220d includes low-power intermittently operating receiver circuitry that is the same or similar to the circuitry of utility meter endpoints 204. In this embodiment, auxiliary transceiver 220d is programmed to periodically power up, momentarily, in an attempt to detect the presence of a communication signal in a similar operating mode as described above with respect to utility meter endpoint 204 receiver low-power operation.

In an example operation, auxiliary transceiver 220e transmits a prompt according to a preconfigured periodic transmission schedule, and activates its receiver circuitry for reception of data from auxiliary transceiver 220d for a predetermined amount of time sufficient to receive communications responsive to the prompt. In one embodiment the prompt broadcast from auxiliary transceiver 220e is identical to a prompt to which utility meter endpoints 204 are responsive. In this embodiment, auxiliary transceivers 220 are configured to not respond to prompts for a predefined time after issuing a prompt themselves. This feature prevents more than one auxiliary transceiver 220 within communications range of one another from endlessly exchanging prompts. The prompt is included in communications 226d, and is detected by auxiliary transceiver 220d during one of its intermittent signal detection attempts. In response to the prompt, auxiliary transceiver 220d broadcasts a utility meter prompt to utility meter endpoints 204 in its coverage area 222d, and activates its receiver circuitry for reception of data from utility meter endpoints 204 for a predetermined amount of time sufficient to receive communications responsive to the prompt.

In one embodiment, the prompt broadcast from auxiliary transceiver 220e (intended to evoke a response from another auxiliary transceiver 220) is identical to a prompt to which utility meter endpoints 204 are responsive, such as the prompt broadcast from auxiliary transceiver 220d. In this embodiment, auxiliary transceivers 220 are configured to not respond to prompts for a predefined time after issuing a prompt themselves. In an alternative embodiment, the prompt broadcast from auxiliary transceiver 220e (intended to evoke a response from another auxiliary transceiver 220) includes an indication that distinguishes it from a prompt intended to evoke a response from utility meter endpoints 204. Either of these features prevents an oscillatory situation in which, for example, auxiliary transceivers 220e responds to a prompt from auxiliary transceiver 220d intended for utility meter endpoints 204 by broadcasting a second prompt, to which auxiliary transceiver 220d again responds.

Each of utility meter endpoints 204 within area of coverage 222d responds to the prompt issued by auxiliary transceiver 220d by transmitting its consumption and other information according to a predefined protocol, such as slotted ALOHA mode. Auxiliary transceiver 220d receives each utility meter's data, and transmits each set of data to auxiliary transceiver 220e. In one embodiment, auxiliary transceiver 220d transmits each set of utility meter endpoint 204 data individually, and in the same format as in which the data was received from the corresponding utility meter endpoint 204.

The present invention may be embodied in other specific forms without departing from the spirit of the essential attributes thereof, therefore, the illustrated embodiments should be considered in all respects as illustrative and not restrictive, reference being made to the appended claims rather than to the foregoing description to indicate the scope of the invention.

What is claimed is:

1. In an automatic meter reading (AMR) communications system having a plurality of endpoints adapted for two-way communications with collection transceivers, a plurality of collection transceivers each having a communications range that defines a principal coverage area and adapted to obtain information from endpoints located in the principal coverage area via at least the two-way communications for which the plurality of endpoints are adapted, a method of improving AMR system coverage comprising:
   providing an auxiliary transceiver in a fixed location, wherein the auxiliary transceiver has a communications range that defines an auxiliary coverage area;
   automatically operating the auxiliary transceiver in a low-power standby mode during a first time duration, and automatically operating the auxiliary transceiver in an active mode during a second time duration that is shorter than the first time duration, wherein operating the auxiliary transceiver during the second time duration includes:
   exiting the standby mode to enter an active operating mode;
   independently initiating a command directed to at least one endpoint in the auxiliary coverage area to obtain information from that at least one endpoint, wherein the command is substantially in a form of a command transmitted for reception by the plurality of endpoints according to the two-way communications for which the plurality of endpoints are adapted;
   receiving endpoint information transmitted from the at least one endpoint located in the auxiliary coverage area in response to the command; and
   transmitting at least a subset of the received endpoint information to at least one of the plurality of collection transceivers, wherein the transmitting is in response to a prompting signal from one of the plurality of collection transceivers directed to endpoints.

2. The method of claim 1, wherein transmitting at least the subset of the received endpoint information to the at least one of the plurality of collection transceivers includes transmitting at least the subset of the received endpoint information to at least one transceiver selected from the group consisting of: an intermediate transceiver, and a central transceiver.

3. The method of claim 1, wherein providing the auxiliary transceiver in the fixed location includes establishing the auxiliary coverage area such that the auxiliary coverage area at least partially overlaps with at least one principal coverage area.

4. The method of claim 1, wherein communicating with the endpoint on a prompt-response basis includes communicating a command and control frame as the prompt.

5. The method of claim 1, wherein the endpoint information includes metered data, and wherein operating during the second time duration includes re-formatting the metered data.

6. The method of claim 1, wherein the first time duration is randomized such that operating the auxiliary transceiver during the second time duration is performed at random intervals.

7. An automatic meter reading (AMR) system, comprising:
   a plurality of utility meter endpoints, each of the utility meter endpoints including a radio-frequency (RF) transceiver adapted to transmit endpoint information based on a prompt-response mode of communication;
   a plurality of collectors having a communications range that defines a principal coverage area, each collector adapted to receive endpoint information from utility meter endpoints located within a corresponding portion of the principal coverage area based on the prompt-response mode of communication;

a central transceiver adapted to communicate with each of the collectors and to collect endpoint information; and an auxiliary transceiver having a communications range that defines an auxiliary coverage area that includes an area outside of the principle coverage area, wherein the auxiliary transceiver is adapted to automatically independently initiate communication with utility meter endpoints in the auxiliary coverage area based on the prompt-response mode of communication, and is adapted to automatically transmit received endpoint information to at least one of the plurality of collectors in a one-way communication mode.

8. The AMR system according to claim 7, wherein the auxiliary transceiver operates without any connection to an external power source.

9. The AMP system of claim 7, wherein the auxiliary transceiver is adapted to automatically communicate with at least one preexisting transceiver such that the at least one preexisting transceiver does not need to be re-configured to support communications with the auxiliary transceiver.

10. An auxiliary transceiver for use with an automated meter reading (AMR) system that includes an endpoint and a reader, the auxiliary transceiver comprising:

a radio frequency (RF) receiver circuit;
a RF transmitter circuit;
a processor coupled with the RF receiver and the RF transmitter circuits; and
an on-board power source that supplies energy to the RF receiver, RF transmitter, and CPU circuits;
wherein the processor is programmed to cause the auxiliary transceiver to automatically:
independently initiate a process that gathers endpoint information from the endpoint, wherein the process causes the auxiliary transceiver to substantially appear to the endpoint as a reader; and
initiate a one-way communication with the reader to transmit at least a subset of the endpoint information while substantially mimicking an endpoint transmission.

11. The auxiliary transceiver of claim 10, wherein the processor is further programmed to cause the auxiliary transceiver to re-format the endpoint information received from the endpoint.

12. The auxiliary transceiver of claim 10, wherein the auxiliary transceiver includes a common hardware platform with that of a utility meter endpoint.

13. The auxiliary transceiver of claim 10, wherein the processor is programmed to enter the active operating mode at randomized time intervals.

14. An auxiliary transceiver for use with an automated meter reading (AMR) system that includes a plurality of endpoints and at least one data collector, the auxiliary transceiver comprising:

means for independently initiating a process that includes receiving communications from at least one of the plurality of endpoints to receive endpoint information while appearing substantially as a data collector to the at least one of the plurality of endpoints; and means for transmitting at least a subset of the received endpoint information to the at least one data collector while substantially mimicking an endpoint-initiated transmission.

15. In an automatic meter reading (AMR) communications system having a plurality of endpoints adapted for two-way communications, a plurality of principal transceivers having a communications range that defines a principal coverage area and adapted to receive endpoint information from endpoints located in the principal coverage area, and a central collector that collects endpoint information from at least the plurality of principal transceivers, a method of improving AMR system coverage comprising:

providing an auxiliary transceiver in a fixed location, wherein the auxiliary transceiver has a communications range that defines an auxiliary coverage area;
automatically operating the auxiliary transceiver, including:
independently initiating a process to obtain information from at least one endpoint located in the auxiliary coverage area while substantially appearing to the at least one endpoint as one of the principle transceivers;
transmitting at least a subset of the received endpoint information for collection by the central collector while substantially mimicking a communication potentially initiated by the at least one endpoint.

16. The method of claim 15, wherein independently initiating the process to obtain information from at least one endpoint includes transmitting a prompt to which endpoints are generally responsive.

17. The method of claim 16, wherein transmitting the prompt includes transmitting a prompt that includes at least one of a fixed wakeup sequence and a command and control frame.

18. The method of claim 15, wherein transmitting at least the subset of the received information includes transmitting data representing received endpoint metered data to at least one of the plurality of principal transceivers.

19. The method of claim 15, wherein transmitting at least the subset of the received information includes transmitting data in a one-way communication mode.

20. The method of claim 15, wherein automatically operating the auxiliary transceiver includes automatically operating the auxiliary transceiver in a low-power standby mode during a first time duration, and automatically operating the auxiliary transceiver in an active mode during a second time duration that is shorter than the first time duration, wherein independently initiating the process and transmitting at least the subset of the received endpoint information occurs during the second time duration.

21. The method of claim 15, wherein providing the auxiliary transceiver in the fixed location is performed such that the auxiliary transceiver remains electrically disconnected from any power source external to the auxiliary transceiver.

22. The method of claim 15, wherein providing the auxiliary transceiver consists essentially of
pre-configuring the auxiliary transceiver;
selecting a location for installation; and
fixing the auxiliary transceiver in the selected location;
such that the auxiliary transceiver remains transparent to the AMR system.

23. The method of claim 15, wherein providing the auxiliary transceiver does not require configuring any of the plurality of principal transceivers or of the central collector to enable operability of the auxiliary transceiver.

24. The method of claim 20, wherein automatically operating the auxiliary transceiver in the active mode during the second time duration is performed at non-periodic intervals.

25. An automatic meter reading (AMR) system, comprising:
a plurality of utility meter endpoints, wherein each of the utility meter endpoints includes a radio-frequency (RF) transceiver adapted for transmitting endpoint information based on at least one of two modes, a first mode being on a bubble-up basis and a second mode being in response to a received RF prompting signal;

a plurality of collectors having a communications range that defines a principal coverage area, each collector adapted to receive endpoint information from utility meter endpoints located within a corresponding portion of the principal coverage area;

a central storage arrangement adapted to communicate with each of the collectors and to store endpoint information in a central database; and an auxiliary transceiver having a communications range that defines an auxiliary coverage area, wherein the auxiliary transceiver is adapted to automatically independently initiate a process to obtain endpoint information from at least one utility meter endpoint in the auxiliary coverage area, wherein the process includes independently initiating a command to the at least one utility meter endpoint, and adapted to automatically transmit the endpoint information to at least one of the plurality of collectors utilizing a communication format that substantially mimics a communication potentially initiated by the at least one endpoint.

26. The AMR system of claim 25, wherein the process to obtain endpoint information includes transmitting a prompt by the auxiliary transceiver requesting the endpoint information.

27. The AMR system of claim 26, wherein the prompt transmitted by the auxiliary transceiver includes at least one of a fixed wakeup sequence and a command and control frame.

28. The AMR system of claim 25, wherein the auxiliary transceiver includes a low-cost receiver (LCR).

29. The AMR system of claim 25, wherein the auxiliary transceiver includes circuitry substantially similar to circuitry included in a utility meter endpoint.

30. The AMR system of claim 29, wherein the auxiliary transceiver includes circuitry that is the same as communications circuitry included in a utility meter endpoint.

31. The AMR system of claim 25, wherein the auxiliary transceiver includes a battery.

32. The AMP system of claim 25, wherein the auxiliary transceiver operates without any connection to an external power source.

33. The AMR system of claim 25, wherein the auxiliary transceiver automatically communicates with at least one of the plurality of collectors without prior configuration of any of the collectors.

34. The AMR system of claim 26, wherein the auxiliary transceiver transmits the prompt at non-periodic intervals.

35. The AMR system of claim 25, wherein the auxiliary transceiver automatically transmits the endpoint information in a one-way communication mode.

36. The AMR system of claim 25, wherein the auxiliary transceiver automatically operates in a low-power standby mode during time periods between instances of automatic transmissions.

37. An auxiliary transceiver for use with an automated meter reading (AMR) system, comprising:

a radio frequency (RF) receiver circuit;

a RF transmitter circuit;

a processor adapted to be coupled to the RF receiver and the RF transmitter circuits and adapted to execute a program that causes the auxiliary transceiver to automatically:

independently initiate a process to obtain endpoint information from at least one endpoint of the AMR system;

receive endpoint information transmitted in response to the process; and transmit at least a subset of the endpoint information utilizing a communication format that substantially mimics a communications format of an AMR system endpoint.

38. The auxiliary transceiver of claim 37, wherein the process to obtain endpoint information includes transmitting a RF prompting signal that is addressed to a utility meter endpoint.

39. The auxiliary transceiver of claim 38, wherein the RF prompting signal includes at least one of a fixed wakeup sequence and a command and control frame.

40. The auxiliary transceiver of claim 37, wherein the auxiliary transceiver is adapted to transmit at least the subset of the endpoint information in a one-way communication mode.

41. The auxiliary transceiver of claim 37, wherein the receiver circuit is a low-cost receiver (LCR) circuit 42. The auxiliary transceiver of claim 37, wherein the auxiliary transceiver is free of any hardware for connecting to an external power source.

43. The auxiliary transceiver of claim 37, wherein the active operating mode is entered into at randomized time intervals.

44. The auxiliary transceiver of claim 37, further comprising:

a battery configured to supply energy to the RF receiver, RF transmitter, and CPU circuits; and wherein the program executed by the processor further causes the auxiliary transceiver to:

during a first time duration, (a) automatically operate in a low-power standby mode and, during a second time duration that is shorter than the first time duration, (b) automatically operate in an active operating mode during which communication activity takes place.

* * * * *